US012626965B2

(12) United States Patent
Zheng et al.

(10) Patent No.: US 12,626,965 B2
(45) Date of Patent: May 12, 2026

(54) PREPARATION METHOD OF HETEROSITE IRON PHOSPHATE AND APPLICATION THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Shili Zheng, Foshan (CN); Dingshan Ruan, Foshan (CN); Changdong Li, Foshan (CN); Ying Zhang, Foshan (CN); Zhi Sun, Foshan (CN); Yang Zhang, Foshan (CN); Xiaojian Wang, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 535 days.

(21) Appl. No.: 18/265,357

(22) PCT Filed: Oct. 13, 2021

(86) PCT No.: PCT/CN2021/123398
§ 371 (c)(1),
(2) Date: Jun. 5, 2023

(87) PCT Pub. No.: WO2022/116691
PCT Pub. Date: Jun. 9, 2022

(65) Prior Publication Data
US 2024/0055684 A1 Feb. 15, 2024

(30) Foreign Application Priority Data
Dec. 3, 2020 (CN) ......................... 202011396674.X

(51) Int. Cl.
*H01M 10/54* (2006.01)
*C01B 25/37* (2006.01)

(52) U.S. Cl.
CPC ........... *H01M 10/54* (2013.01); *C01B 25/375* (2013.01)

(58) Field of Classification Search
None
See application file for complete search history.

(56) References Cited

U.S. PATENT DOCUMENTS

2014/0272568 A1* 9/2014 Frianeza-Kullberg ......................
C01G 53/42
252/182.1
2019/0296355 A1* 9/2019 Asami .................... C01G 53/06
(Continued)

FOREIGN PATENT DOCUMENTS

CN 107978814 A 5/2018
CN 111792635 A 10/2020
(Continued)

OTHER PUBLICATIONS

International Search Report of PCT Patent Application No. PCT/CN2021/123398 issued on Jan. 13, 2022.
(Continued)

*Primary Examiner* — Kevin M Bernatz
(74) *Attorney, Agent, or Firm* — Westbridge IP LLC

(57) ABSTRACT

The invention belongs to the field of battery material recovery, and discloses a preparation method and application of heterosite phosphate. The method comprises the following steps: mixing lithium iron phosphate with a solvent, adding an acid solution, and adjusting the pH to obtain an acidic lithium iron phosphate liquid; adding a transition metal additive to the acidic lithium iron phosphate liquid, and performing leaching in an intensifying micro-environment, followed by filtrating to obtain heterosite iron phosphate and a lithium-rich solution. The leaching rate of lithium in the leaching solution reaches 90.5-99.9%, and both of the iron (Continued)

and phosphorus content in the leaching solution are less than 0.1 ppm; the recovered heterosite iron phosphate has a purity of 99.9%, and the recovery rate of the heterosite iron phosphate is 99.3%.

15 Claims, 3 Drawing Sheets

(56)                    References Cited

U.S. PATENT DOCUMENTS

2024/0095690 A1 *    3/2024    Steinbauer ............. G06Q 10/30
2025/0062432 A1 *    2/2025    Ahn ...................... H01M 4/525

FOREIGN PATENT DOCUMENTS

CN          111924815  A      11/2020
WO          2012072619  A1      6/2012

OTHER PUBLICATIONS

Lieyu Zhang et al., Research on Decentralized Rural Domestic Wastewater Treatment Technology, Nov. 30, 2014, p. 214, Section 7.2.3.
Certified Environmental Protection Engineer Professional Examination Review Materials, Water Pollution Control Engineering Technology and Practice, Mar. 31, 2017, p. 249, Section 5.

* cited by examiner

PREPARATION METHOD OF HETEROSITE IRON PHOSPHATE AND APPLICATION THEREOF

TECHNICAL FIELD

The invention relates to the technical field of battery recycle, and in particular to a preparation method of heterosite iron phosphate and application thereof.

BACKGROUND

In recent years, with rapidly increasing electronic and electrical equipment output, the demand for lithium-ion batteries has also continued to rise. However, lithium-ion batteries have a limited service life, thereby a large number of waste lithium-ion batteries are produced every year. If these lithium ion batteries cannot be properly recycled, serious resource and environmental problems will arise. On the one hand, lithium ion batteries contain high levels of valuable metals, such as lithium, nickel, cobalt, and manganese, the contents of which in lithium ion batteries are much higher than their average contents in ores. If the metals cannot be properly recycled, it will cause a huge waste of resources; on the other hand, the heavy metals and harmful electrolytes in the waste lithium ion battery will also cause potential harm to natural environment and human health. If these lithium-ion batteries can be effectively recycled, not only a large amount of valuable metals can be recovered, and resource waste can be reduced, but also the pressure on ecological and environmental protection can be reduced.

Among the cathode materials for lithium ion batteries, ternary cathode materials and LiFePO4 cathode materials occupy a considerable market share due to their excellent performance. Among the ternary cathode materials, lithium, nickel, cobalt, and manganese are valuable metals with high recovery value, while in LiFePO4 cathode materials, lithium has a high recovery value. Therefore, the recovery of LiFePO4 cathode mainly focuses on the recovery of lithium. At present, the recovery of lithium iron phosphate cathode materials is mainly through wet technology, comprising the following ways: (1) Excess acid+excess oxidant completely leaches the lithium iron phosphate to obtain a mixture, and then adjusts the pH of the mixture to precipitate FePO4·2H$_2$O though binding of Fe$^{3+}$ and PO$_4$$^{3-}$, and then a lithium-containing solution is obtained; (2) The stoichiometric ratio of acid and oxidant selectively leaches lithium to obtain a lithium-containing solution and iron phosphate. The iron phosphate recovered by these two methods is mainly precipitated in the form of FePO4·2H$_2$O, which is difficult to dissolve in acid. To further recover the iron and phosphorus resources, a calcination is needed before FePO4·2H$_2$O can be dissolved, which makes the recovery of iron and phosphorus resources difficult. At the same time, the oxidants used in the leaching process of the above methods are mainly chemical reagents such as hydrogen peroxide, persulfate, sodium hypochlorite, etc., and the leaching cost is high.

Therefore, there is an urgent need to develop a lithium iron phosphate recovery process with high leaching selectivity, low leaching cost, and short recovery process.

SUMMARY OF THE INVENTION

An objective of the present invention is to provide a preparation method and application of heterosite iron phosphate, addressing the problems in the prior art of the iron phosphate recovery such as poor selectivity for lithium extraction, high consumption of agents, long recovery process, and low product value. By providing an improved process, direct preparation of heterosite lithium phosphate is achieved while possessing the advantages of low impurity content in the leaching solution, high lithium concentration, low agent's consumption, and high lithium recovery rate.

In order to achieve the aforementioned objective, the following technical solution is adopted in the invention.

A preparation method of heterosite iron phosphate comprises the following steps:

(1) Mixing lithium iron phosphate with a solvent to obtain a slurry, adding an acid solution and adjusting the slurry to acidic pH to obtain an acidic lithium iron phosphate liquid;

(2) Adding a transition metal additive to the acidic lithium iron phosphate liquid to obtain a mixture, performing leaching in an intensifying micro-environment to the mixture, followed by filtrating to obtain a heterosite iron phosphate and a lithium-rich solution; the leaching in an intensifying micro-environment is to leach iron phosphate out of the acidic lithium iron phosphate liquid with microbubbles or under controlled pressure;

The heterosite iron phosphate is a product obtained by delithiation of an olivine-type lithium iron phosphate. At present, there are many crystal phases of iron phosphate reported in literatures: the orthorhombic heterosite iron phosphate formed by delithiation of the lithium iron phosphate, monoclinic iron phosphate, orthorhombic iron phosphate, or α-quartz crystal iron phosphate; its aqueous phase comprises monoclinic iron phosphate dihydrate and orthorhombic iron phosphate dihydrate.

Preferably, in step (1), the lithium iron phosphate is recovered from waste lithium iron phosphate cathode materials.

More preferably, the lithium iron phosphate is obtained by discharging, pulverizing, and screening the waste lithium iron phosphate cathode materials; the lithium iron phosphate mainly contains elements of Li, P, Fe, Al, C, and O.

Preferably, in step (1), the solvent is water.

Preferably, in step (1), the acid solution used for adjusting the pH is at least one selected from the group consisting of sulfuric acid, nitric acid, and hydrochloric acid.

More preferably, the acid solution has a concentration of 0.5-5 mol/L.

The above acid solution is to provide hydrogen ions and maintain the pH during the leaching process.

Preferably, in step (1), adjusting the slurry to acidic pH is to adjust the pH of the slurry to 2-6.

Preferably, the microbubbles are produced by introducing a gas into the acidic lithium iron phosphate liquid, and the gas is air or oxygen. A method of oxygen enhancement is to increase the oxidizing ability and mass transfer efficiency of oxygen by intensifying micro-environment, that is, using the self-pressurization effect of microbubbles or the means of raising oxygen-enriched pressure to improve the oxidation effect of oxygen, and achieve the object to leach iron phosphate in a weak acidic condition.

More preferably, the microbubbles produced by introducing a gas into the acidic lithium iron phosphate liquid has a diameter of 10-50 μm.

More preferably, the controlled pressure is 0.05-1 Mpa.

Preferably, in step (2), the transition metal additive is at least one selected from the group consisting of nickel oxide, cobalt tetroxide, manganese dioxide, lithium cobaltate, lithium nickelate, lithium manganate or lithium nickel cobalt manganate.

Preferably, in step (2), the acidic lithium iron phosphate liquid and the transition metal additive are in a mass volume ratio of 50-400 g/L.

Preferably, in step (2), the transition metal additive is added at an amount of 0.5-6% of the amount of the lithium iron phosphate.

The nickel cobalt manganese transition metal additive is introduced to surface catalyze the microbubbles/oxygen microbubbles produced by pressure control/dissolved oxygen to generate strong oxidizing hydroxyl radicals, in order to enhance the oxidizing ability on divalent iron and its oxidation reaction rate.

Preferably, in step (2), the leaching is carried out at a temperature of 25° C.-80° C. for 30-240 min.

There are three main methods for leaching lithium iron phosphate. Method (I) involves oxidative leaching the lithium iron phosphate under strong acidic conditions to obtain a solution containing $Li^+$, $Fe^{3+}$, and $PO_4^{3-}$, and then adjusting the pH of the solution to obtain an iron phosphate precipitated by the binding of $Fe^{3+}$ and $PO_4^{3-}$; Method (II) comprises leaching lithium iron phosphate under moderate acidity to obtain a solution containing $Li^+$, $Fe^{2+}$, and $PO_4^{3-}$, and then using a strong oxidant to oxidize $Fe^{2+}$ in the leaching solution to $Fe^{3+}$, and then $Fe^{3+}$ binding with $PO_4^{3-}$ to form iron phosphate precipitation to achieve a selective Leaching. Method (III) is a selective leaching of lithium iron phosphate through direct oxidation and delithiation of lithium iron phosphate using strong oxidizing agents under weak acid conditions and produce isomanganese iron phosphate. In this method, due to the low mass transfer and oxidation potential of oxygen, although the oxidation of $Fe^{2+}$ can be achieved to a certain extent, the oxidation capacity is weak. Therefore, in the actual process, intensifiers such as hydrogen peroxide, sodium persulfate, sodium hypochlorite, and ozone are usually used as oxidants to achieve the oxidation of $Fe^{2+}$. When oxygen/air is used as the oxidant to leaching lithium iron phosphate cathode material, $Fe^{2+}$ oxidation cannot be effectively carried out, resulting in high $Fe^{2+}$ content in the leaching solution and poor selective leaching of lithium. Therefore, it is necessary to improve the oxidation capacity of oxygen to achieve efficient and selective leaching of lithium.

It can be seen from formula (1) that the oxidation potential of oxygen/air is related to the pH and pressure of the solution, that is, increasing the oxygen pressure and reducing the pH of the solution can both increase the oxidation potential of oxygen and increase the oxidizing ability of oxygen. But reducing the pH of the solution will undoubtedly lead to an increasing consumption of acid and the leaching of iron and phosphorus. Therefore, under weak acid conditions, the use of micro-environment intensification means to change the oxidation potential of oxygen in the solution can achieve selective leaching of lithium iron phosphate. Microbubbles have a self-pressurizing effect, which can increase the oxygen oxidation potential by generating local micro-domain pressure changes. At the same time, active oxygen can also be generated on the surface of the microbubbles to greatly increase the oxidizing ability of oxygen. The pressure control method can also increase the oxygen oxidation potential by changing the partial pressure of oxygen in the leaching environment. Therefore, through intensifying the micro-environment, the oxidation performance of oxygen is improved.

$$O_2 + 4H^+ + 4e^- = 2H_2O \ E = E^\theta - 0.059 \ pH + \frac{2.303RT}{4F} \ lg \ P_{O_2} \quad (1)$$

4

On the other hand, when nickel-cobalt-manganese transition metal additives are present, oxygen microbubbles or dissolved oxygen that increase the oxidizing ability through dissolved oxygen pressurization will generate strong oxidizing hydroxyl radicals under the surface catalysis of the transition metal additives, further improving the oxidizing ability of oxygen/air and the oxidation capacity and oxidation reaction rate of ferrous iron. Thereby, the solid-phase oxidation of $Fe^{2+}$ can be realized without a further addition of an oxidant, and the direct solid-phase delithiation of lithium iron phosphate can be achieved to produce a heterosite iron phosphate product.

Preferably, in step (2), further purifying the lithium-rich solution comprises adjusting the pH of the lithium-rich solution, removing impurities from the solution, adding sodium carbonate to the solution, filtering, and drying to obtain lithium carbonate.

The present invention also provides the application of the above-mentioned preparation method in the preparation of battery cathode materials.

Beneficial Effects

The method of the present invention comprises mixing lithium iron phosphate with water to prepare a slurry and adding acid to the slurry to maintain the pH of the leachate between 2-6 during the process, and then adding a nickel cobalt manganese transition metal additive at the same time combined with a microenvironment intensifying means to realize the surface catalytic enhancement reaction which promotes the generation of hydroxyl radicals, and greatly increase the oxidation reaction rate on divalent iron, so as to achieve the selective leaching of lithium under oxygen/air conditions. The leaching rate of lithium in the leaching solution reaches 90.5-99.9%, and both of the iron and phosphorus content in the leaching solution are less than 0.1 ppm; the recovered heterosite iron phosphate has a purity of 99.9%, and the recovery rate of the heterosite iron phosphate is 99.3%.

DETAILED DESCRIPTION OF THE ILLUSTRATED EXAMPLES

Figure 1:
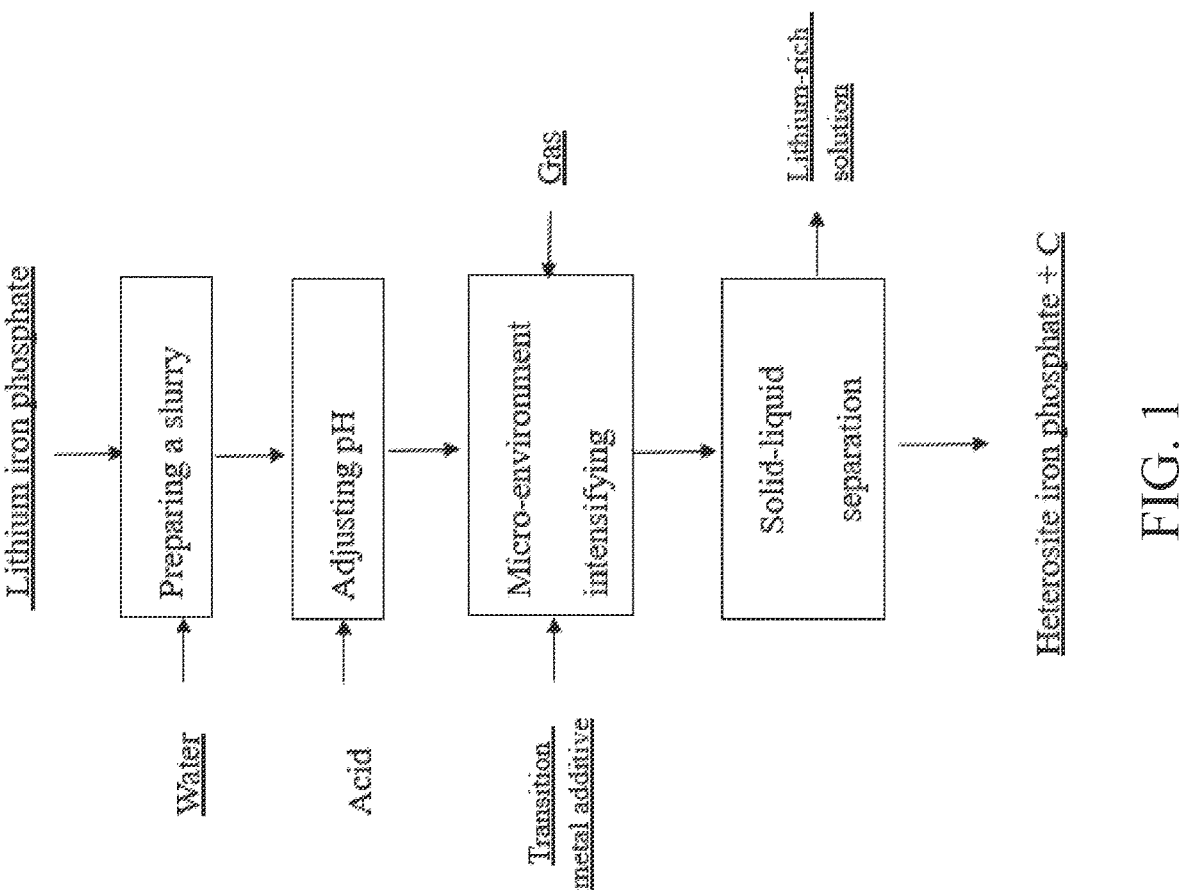
FIG. 1 is a process flow diagram of Example 1 for recovering the heterosite iron phosphate.

In order to fully understand the present invention, the preferred experimental scheme of the present invention will be described below in conjunction with examples to further illustrate the characteristics and advantages of the present invention. Any change or alteration that does not deviate from the gist of the present invention can be understood by those skilled in the art. The scope of protection of the invention is determined by the scope of the claims.

Where specific conditions are not indicated in the examples of the present invention, it shall be carried out under the conventional conditions or the conditions recommended by the manufacturer. The raw materials, reagents, etc. used without indicating their manufacturers are all conventional products commercially available.

Example 1

A preparation method of the heterosite iron phosphate of this embodiment comprises the following steps:
  (1) Mixing lithium iron phosphate and water in a mass-volume ratio of 50 g/L to obtain a slurry, and then adding 2 mol/L hydrochloric acid to the slurry to maintain the pH at 2 during the leaching process to obtain an acidic lithium iron phosphate liquid;
  (2) Adding cobalt tetroxide to the acidic lithium iron phosphate liquid to obtain a mixture, and introducing oxygen into the mixture to generate microbubbles with a diameter of 50 μm to perform leaching at 25° C. for 240 min; after the leaching was completed, filtrating the mixture to obtain a lithium-rich solution and heterosite iron phosphate. The leaching rate of the lithium in the leaching solution reached 99.5%, and the content of iron and the content of phosphorus in the leaching solution were less than 0.1 ppm.

Example 2

A preparation method of the heterosite iron phosphate of this embodiment comprises the following steps:
  (1) Mixing lithium iron phosphate and water in a mass-volume ratio of 50 g/L to obtain a slurry, and then adding 2 mol/L hydrochloric acid to the slurry to maintain the pH at 6 during the leaching process to obtain an acidic lithium iron phosphate liquid;
  (2) Adding manganese dioxide to the acidic lithium iron phosphate liquid to obtain a mixture, and introducing oxygen into the mixture to generate microbubbles with a diameter of 50 μm to perform leaching at 25° C. for 240 min; after the leaching was completed, filtrating the mixture to obtain a lithium-rich solution and heterosite iron phosphate. The leaching rate of lithium in the leaching solution reached 93.9%, and the content of iron and the content of phosphorus in the leaching solution were less than 0.01 ppm.

Example 3

A preparation method of the heterosite iron phosphate of this embodiment comprises the following steps:
  (1) Mixing lithium iron phosphate and water in a mass-volume ratio of 400 g/L to obtain a slurry, and then adding 2 mol/L hydrochloric acid to the slurry to maintain the pH at 2 during the leaching process to obtain an acidic lithium iron phosphate liquid;
  (2) Adding lithium-nickel-cobalt manganate to the acidic lithium iron phosphate liquid to obtain a mixture, and introducing oxygen into the mixture to generate microbubbles with a diameter of 50 μm to perform leaching at 25° C. for 240 min; after the leaching was completed, filtrating the mixture to obtain a lithium-rich solution and heterosite iron phosphate. The leaching rate of lithium in the leaching solution reached 96.7%, and the content of iron and the content of phosphorus in the leaching solution were less than 0.1 ppm.

Example 4

A preparation method of the isomorphoside-type iron phosphate of this embodiment comprises the following steps:

(1) Mixing lithium iron phosphate and water in a mass-volume ratio of 50 g/L to obtain a slurry, and then adding 2 mol/L hydrochloric acid to the slurry to maintain the pH at 6 during the leaching process to obtain an acidic lithium iron phosphate liquid;
  (2) Adding manganese dioxide to the acidic lithium iron phosphate liquid to obtain a mixture, and introducing oxygen into the mixture to generate microbubbles with a diameter of 10 μm to perform leaching at 25° C. for 240 min. After the leaching was completed, filtrating the mixture to obtain a lithium-rich solution and heterosite iron phosphate. The leaching rate of lithium in the leaching solution reached 98.6%, and the content of iron and the content of phosphorus in the leaching solution were less than 0.01 ppm.

Example 5

A preparation method of the heterosite iron phosphate of this embodiment comprises the following steps:
  (1) Mixing lithium iron phosphate and water in a mass-volume ratio of 50 g/L to obtain a slurry, and then adding 2 mol/L hydrochloric acid to the slurry to maintain the pH at 6 during the leaching process to obtain an acidic lithium iron phosphate liquid;
  (2) Adding manganese dioxide to the acidic lithium iron phosphate liquid to obtain a mixture, and introducing oxygen into the mixture to generate microbubbles with a diameter of 10 μm to perform leaching at 80° C. for 240 min. After the leaching was completed, filtrating the mixture to obtain a lithium-rich solution and heterosite iron phosphate. The leaching rate of lithium in the leaching solution reached 99.5%, and the content of iron and the content of phosphorus in the leaching solution were less than 0.01 ppm.

Example 6

A preparation method of the heterosite iron phosphate of this embodiment comprises the following steps:
  (1) Mixing lithium iron phosphate and water in a mass-volume ratio of 50 g/L to obtain a slurry, and then adding 2 mol/L hydrochloric acid to the slurry to maintain the pH at 6 during the leaching process to obtain an acidic lithium iron phosphate liquid;
  (2) Adding lithium manganate to the acidic lithium iron phosphate liquid to obtain a mixture, and introducing oxygen into the mixture to generate microbubbles with a diameter of 10 μm to perform a leaching at 25° C. for 240 min. After the leaching is completed, filtrating the mixture to obtain a lithium-rich solution and heterosite iron phosphate. The leaching rate of lithium in the leaching solution reached 90.5%, and the content of iron and the content of phosphorus in the leaching solution were less than 0.01 ppm.

Example 7

A preparation method of the heterosite iron phosphate of this embodiment comprises the following steps:
  (1) Mixing lithium iron phosphate and water in a mass-volume ratio of 400 g/L to obtain a slurry, and then adding 2 mol/L hydrochloric acid to the slurry to maintain the pH at 6 during the leaching process to obtain an acidic lithium iron phosphate liquid;
  (2) Adding manganese dioxide to the acidic lithium iron phosphate liquid to obtain a mixture, and introducing oxygen into the mixture to generate microbubbles with a diameter of 10 μm and performing leaching under 0.05 Mpa oxygen pressure, the leaching was carried out at 80° C. for 240 min. After the leaching was completed, filtrating the mixture to obtain a lithium-rich solution and heterosite iron phosphate. The leaching rate of lithium in the leaching solution reached 90.5%, and the content of iron and the content of phosphorus in the leaching solution were less than 0.01 ppm.

Example 8

A preparation method of the heterosite iron phosphate of this embodiment comprises the following steps:

(1) Mixing lithium iron phosphate and water in a mass-volume ratio of 50 g/L to obtain a slurry, and then adding 2 mol/L hydrochloric acid to the slurry to maintain the pH at 6 during the leaching process to obtain an acidic lithium iron phosphate liquid;

(2) Adding lithium manganate to the acidic lithium iron phosphate liquid to obtain a mixture, and introducing oxygen at a pressure of 1 Mpa to the mixture, to perform a leaching at 80° C. for 240 min. After the leaching was completed, filtrating the mixture to obtain a lithium-rich solution and heterosite iron phosphate. The leaching rate of lithium in the leaching solution reached 99.9%, and the content of iron and the content of phosphorus in the leaching solution were less than 0.01 ppm.

Example 9

A preparation method of the heterosite iron phosphate of this embodiment comprises the following steps:

(1) Mixing lithium iron phosphate and water in a mass-volume ratio of 400 g/L to obtain a slurry, and then adding 2 mol/L hydrochloric acid to the slurry to maintain the pH at 2 during the leaching process to obtain an acidic lithium iron phosphate liquid;

(2) Adding lithium nickelate to the acidic lithium iron phosphate liquid to obtain a mixture, and introducing oxygen into the mixture to generate microbubbles with a diameter of 50 μm, to perform a leaching at 25° C. for 240 min. After the leaching was completed, filtrating the mixture to obtain a lithium-rich solution and heterosite iron phosphate. The leaching rate of lithium in the leaching solution reached 99.9%, and the content of iron and the content of phosphorus in the leaching solution were less than 0.1 ppm.

Example 10

A preparation method of the heterosite iron phosphate of this embodiment comprises the following steps:

(1) Mixing lithium iron phosphate and water in a mass-volume ratio of 400 g/L to obtain a slurry, and then adding 2 mol/L hydrochloric acid to the slurry to maintain the pH at 2 during the leaching process to obtain an acidic lithium iron phosphate liquid;

(2) Adding nickel oxide to the acidic lithium iron phosphate liquid to obtain a mixture, and introducing oxygen into the mixture to generate microbubbles with a diameter of 50 μm, to perform a leaching at 80° C. for 30 min. After the leaching was completed, filtrating the mixture to obtain a lithium-rich solution and heterosite iron phosphate. The leaching rate of lithium in the leaching solution reached 91.5%, and the content of iron and the content of phosphorus in the leaching solution were less than 0.1 ppm.

Comparative Example

A preparation method of the heterosite iron phosphate of this embodiment comprises the following steps:

Mixing lithium iron phosphate and water in a mass-volume ratio of 400 g/L to obtain a slurry, and then adding an acid to the slurry to maintain the pH at 2 during the leaching process to obtain an acidic lithium iron phosphate liquid; introducing oxygen into the mixture under normal pressure to perform a leaching at 80° C. for 30 min. After the leaching was completed, filtrating the mixture to obtain a lithium-rich solution and heterosite iron phosphate. The leaching rate of lithium in the leaching solution was 58.13%, and the leaching rates of iron and phosphorus in the leaching solution were 10.67% and 9.75%, respectively.

Comparison of the Results

1. Recovery Rate

TABLE 1

| Recovery rate of Example 1 and Comparative Example | | |
|---|---|---|
| Recovered item | Recovery rate of Example 1 (%) | Recovery rate of Comparative Example (%) |
| Heterosite iron phosphate | 99.12 | 89.21 |

2. Purity

TABLE 2

| Elements contents in the lithium-rich solution | | | | | | |
|---|---|---|---|---|---|---|
| Elements | Example 1 | Example 2 | Example 3 | Example 4 | Example 5 | Comparative Example |
| Li | 5.0428 | 4.7968 | 4.9399 | 5.0369 | 5.0829 | 2.9695 |
| Cu | 0 | 0 | 0 | 0 | 0 | 0 |
| Fe | <0.0001 | <0.00001 | <0.0001 | <0.00001 | <0.00001 | 4.3017 |
| Al | 0.9842 | 0.9634 | 0.9945 | 0.9872 | 1.010 | 1.1002 |

TABLE 3

| Purity of the recovered heterosite iron phosphate | | |
|---|---|---|
| Elements | Content of Example 1/% | Content of Comparative Example/% |
| $FePO_4$ | 87 | 82 |
| Li | 0.15 | 1.35 |
| Cu | 0 | 0 |
| Al | 0.03 | 0.04 |
| Na | 0.013 | 0.013 |
| Mg | 0.002 | 0.002 |
| Ca | 0.001 | 0.001 |

TABLE 3-continued

| Elements | Content of Example 1/% | Content of Comparative Example/% |
|---|---|---|
| Zn | 0.004 | 0.004 |
| F | 0.50 | 0.49 |

Purity of the recovered heterosite iron phosphate

Performance Testing:

The lithium iron phosphate prepared from the iron phosphate recovered in the above Examples 1-3 and the comparative example were used as a cathode, graphite was used as an anode. A battery was assembled with the cathode and anode, and its first discharge test was performed at a rate of 1 C.

TABLE 4

Performance test results

| Item | Example 1 (lithium iron phosphate prepared from the recovered iron phosphate) | Example 2 (lithium iron phosphate prepared from the recovered iron phosphate) | Example 3 (lithium iron phosphate prepared from the recovered iron phosphate) | Comparative Example (lithium iron phosphate prepared from the recovered iron phosphate) |
|---|---|---|---|---|
| First discharge capacity mAh/g | 157.1 | 156.9 | 157.2 | 155.6 |
| Capacity after 100 cycles mAh/g | 152.4 | 151.33 | 152.06 | 147.9 |
| Capacity retention rate | 97.01 | 96.45 | 96.73 | 95.05 |

The results are shown in Table 4. At a rate of 0.1 C, the first discharge capacity of the lithium iron phosphate cathode material recovered in the present invention is higher than that of the heterosite iron phosphate recovered in the traditional method, and the first discharge capacity of Example 1 is 157.1 mAh/g, while the specific capacity of the comparative example is only 155.6 mAh/g.

FIG. 1 shows the process flow chart of the recovery of the heterosite iron phosphate in Example 1. From FIG. 1, it can be concluded that by subjecting lithium iron phosphate to pulping, adjusting pH value, leaching with microenvironment intensifying, and solid-liquid separation, a heterosite iron phosphate can be obtained.

Figure 2:
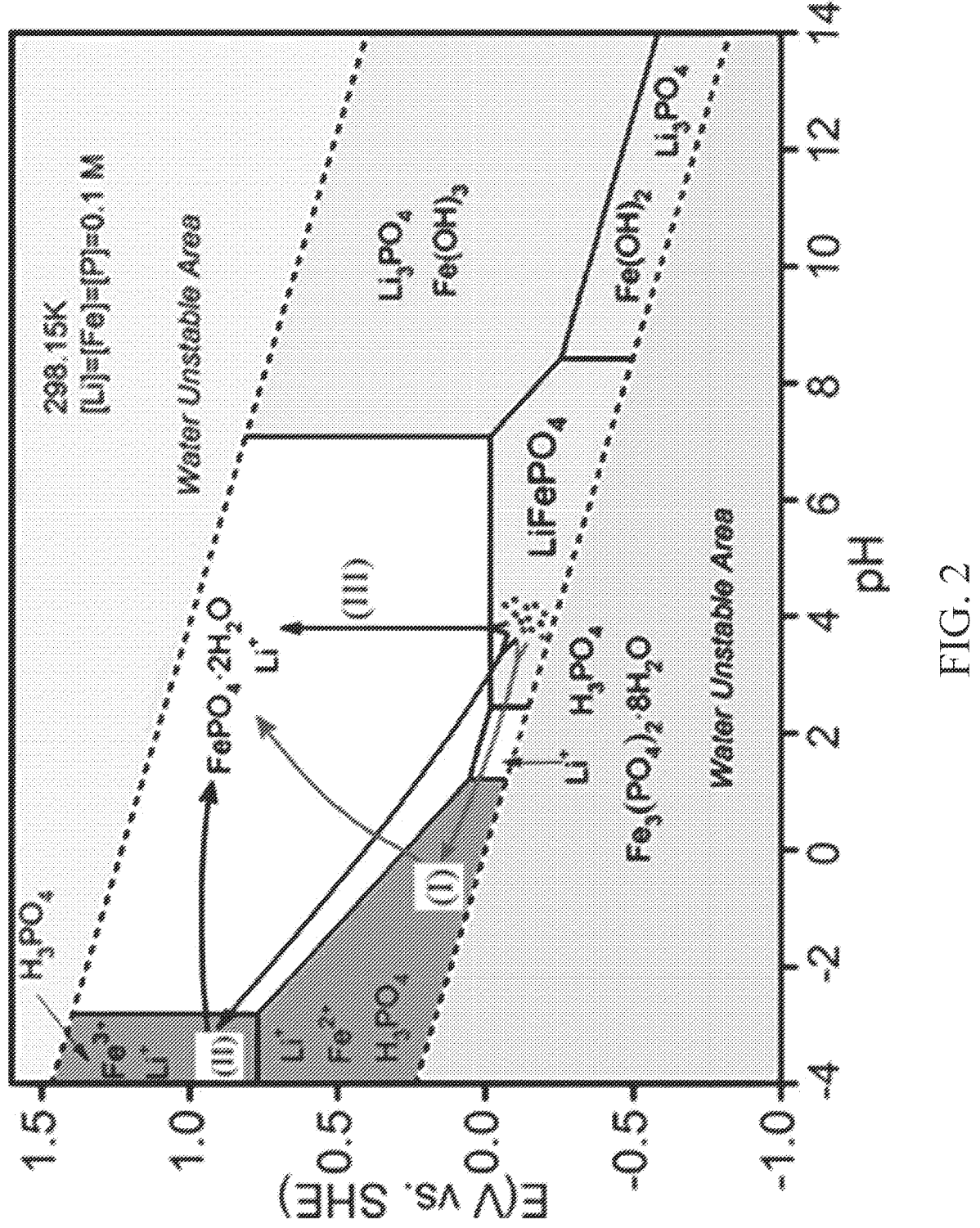
FIG. 2 is a schematic diagram of the leaching route of lithium iron phosphate.

It is illustrated in FIG. 2 that there are three main methods for leaching lithium iron phosphate. Method (I) involves oxidative leaching the lithium iron phosphate under strong acidic conditions to obtain a solution containing $Li^+$, $Fe^{3+}$, and $PO_4^{3-}$, and then adjusting the pH of the solution to obtain an iron phosphate precipitated by the binding of $Fe^{3+}$ and $PO_4^{3-}$; Method (II) comprises leaching lithium iron phosphate under moderate acidity to obtain a solution containing $Li^+$, $Fe^{2+}$, and $PO_4^{3-}$, and then using a strong oxidant to oxidize $Fe^{2+}$ in the leaching solution to $Fe^{3+}$, and then $Fe^{3+}$ binding with $PO_4^{3-}$ to form iron phosphate precipitation to achieve a selective Leaching. Method (III) is a selective leaching of lithium iron phosphate through direct oxidation and delithiation of lithium iron phosphate using strong oxidizing agents under weak acid conditions and produce a heterosite iron phosphate. In this method, due to the low mass transfer and oxidation potential of oxygen, although the oxidation of $Fe^{2+}$ can be achieved to a certain extent, the oxidation capacity is weak. Therefore, in the actual process, intensifiers such as hydrogen peroxide, sodium persulfate, sodium hypochlorite, and ozone are usually used as oxidants to achieve the oxidation of $Fe^{2+}$. When oxygen/air is used as the oxidant to leaching lithium iron phosphate cathode material, $Fe^{2+}$ oxidation cannot be effectively carried out, resulting in high $Fe^{2+}$ content in the leaching solution and poor selective leaching of lithium. Therefore, it is necessary to improve the oxidation capacity of oxygen to achieve efficient and selective leaching of lithium.

Figure 3:
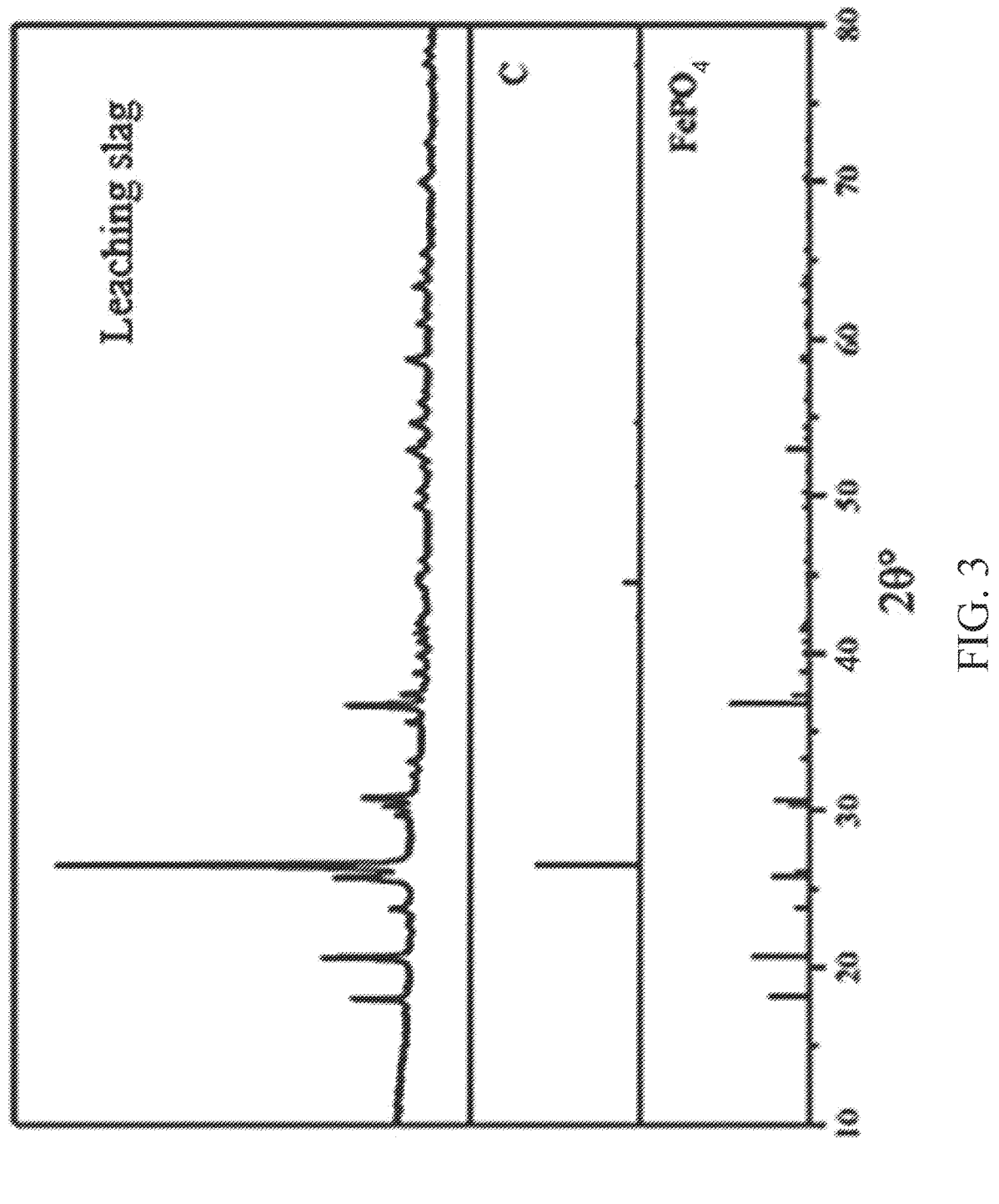
FIG. 3 is an XRD pattern of the recovered heterosite iron phosphate in Example 1.

It can be seen from the XRD spectrum (FIG. 3) that after the leaching of lithium iron phosphate, the leaching slag is mainly composed of heterosite $FePO_4$ and C. During the leaching process, carbon powder does not participate in the reaction, and $LiFePO_4$ participates in the reaction to generate $FePO_4$ in a new phase. Li in the cathode material reacts to form soluble lithium salt, which enters the solution.

The preparation method and application of an heterosite iron phosphate provided by the present invention are described in detail above. Specific examples are used in this article to illustrate the principle and implementation of the present invention. The description of the above examples It is only used to help understand the method and core idea of the present invention, including the best mode, and also enables any person skilled in the art to practice the present invention, including manufacturing and using any device or system, and implementing any combined method. It should be pointed out that for those of ordinary skill in the art, without departing from the principle of the present invention, several improvements and modifications can be made to the present invention, and these improvements and modifications also fall within the protection scope of the claims of the present invention. The scope of patent protection of the present invention is defined by the claims, and may include other embodiments that those skilled in the art can think of. If these other embodiments have structural elements that are not different from the literal expression of the claims, or if they include equivalent structural elements that are not substantially different from the literal expression of the claims, these other embodiments should also be included in the scope of the claims.

The invention claimed is:

1. A preparation method of heterosite iron phosphate, comprising the following steps:

(1) mixing lithium iron phosphate with a solvent to obtain a slurry, adjusting the slurry to an acidic pH to obtain an acidic lithium iron phosphate liquid;

(2) adding a transition metal additive to the acidic lithium iron phosphate liquid to obtain a mixture, performing leaching in an intensifying micro-environment to the mixture, followed by filtration to obtain the heterosite iron phosphate and a lithium-rich solution; the leaching in the intensifying micro-environment is to leach iron phosphate out of the acidic lithium iron phosphate liquid with microbubbles or under controlled pressure; wherein the microbubbles are produced by introducing a gas into the acidic lithium iron phosphate liquid; the controlled pressure increases the oxygen oxidation potential by changing the partial pressure of oxygen in the leaching environment; the microbubbles, or oxygen microbubbles/dissolved oxygen produced by the controlled pressure generate hydroxyl radicals under surface catalysis of the transition metal additive, used for improving the oxidation capacity and oxidation reaction rate of ferrous iron in the lithium iron phosphate liquid.

2. The preparation method according to claim 1, wherein in step (1), adjusting the slurry to the acidic pH is carried out by adding a liquid acid into the slurry, wherein the liquid acid is at least one selected from the group consisting of sulfuric acid, nitric acid, and hydrochloric acid; and the liquid acid has a concentration of 0.5-5 mol/L.

3. The preparation method according to claim 1, wherein in step (1), the lithium iron phosphate is recovered from a waste lithium iron phosphate cathode material.

4. The preparation method according to claim 1, wherein the microbubbles are generated by introducing a gas into the acidic lithium iron phosphate liquid, wherein the gas is air or oxygen; the microbubbles generated by introducing the gas into the acidic lithium iron phosphate liquid have diameters of 10-50 μm.

5. The preparation method according to claim 1, wherein the controlled pressure is 0.05-1 Mpa.

6. The preparation method according to claim 1, wherein in step (2), the transition metal additive is at least one selected from the group consisting of nickel oxide, cobalt tetroxide, manganese dioxide, lithium cobaltate, lithium nickelate, lithium manganate, and lithium-nickel-cobalt manganate.

7. The preparation method according to claim 1, wherein in step (2), the acidic lithium iron phosphate liquid and the transition metal additive are in a mass-volume ratio of 50-400 g/L.

8. The preparation method according to claim 1, wherein in step (2), the lithium-rich solution is subjected to a purification process comprising the following steps: adjusting the lithium-rich solution to an alkaline pH; removing impurities to obtain a purified solution; then adding sodium carbonate to the purified solution to react; filtering and drying a resulting precipitate to obtain lithium carbonate.

9. Battery cathode material prepared by of the preparation method of claim 1.

10. Battery cathode material prepared by the preparation method of claim 2.

11. Battery cathode material prepared by the preparation method of claim 3.

12. Battery cathode material prepared by the preparation method of claim 4.

13. Battery cathode material prepared by the preparation method of claim 5.

14. Battery cathode material prepared by the preparation method of claim 6.

15. Battery cathode material prepared by the preparation method of claim 7.

* * * * *